Patented July 13, 1926.

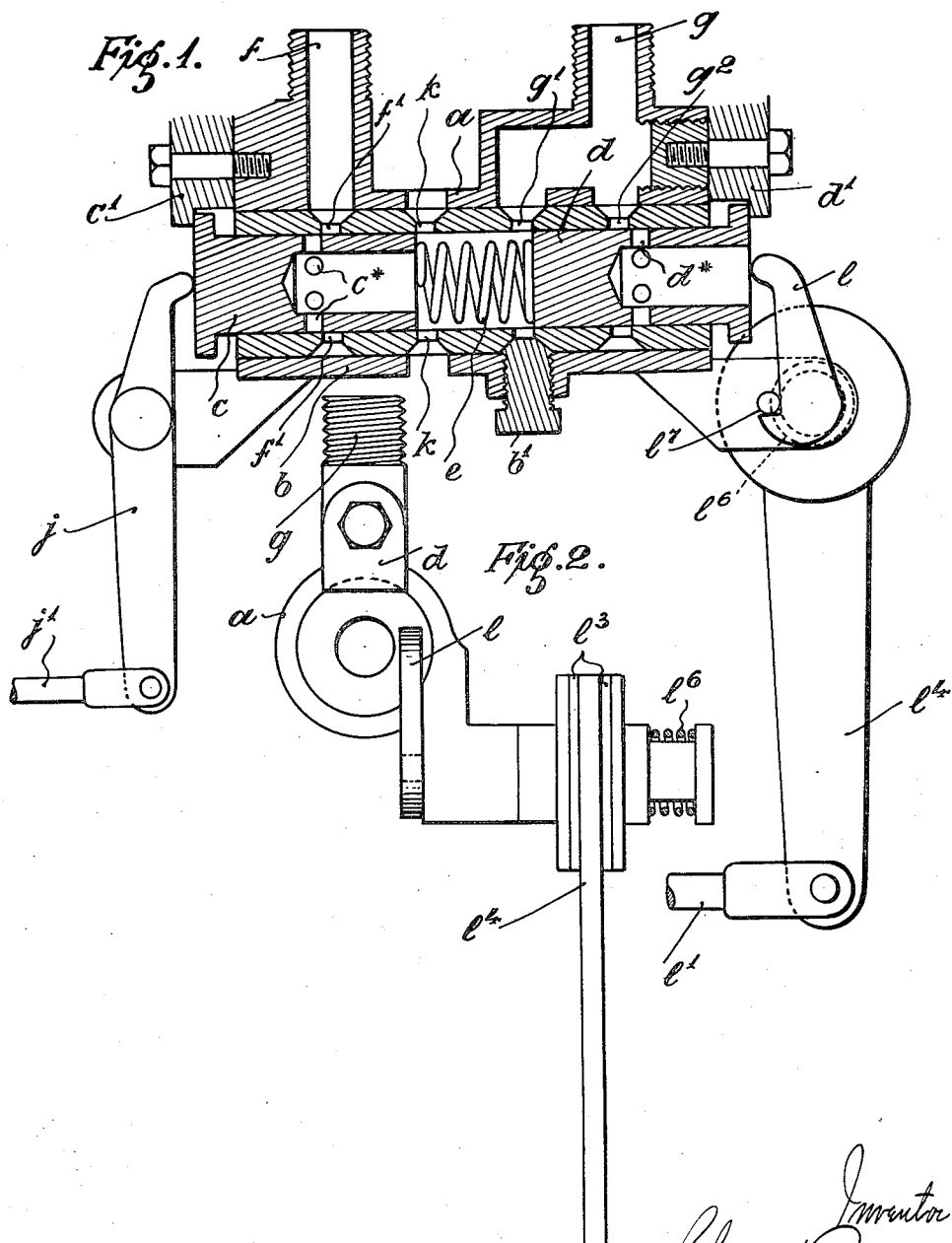

1,592,176

UNITED STATES PATENT OFFICE.

CLEMENT BROWN, OF BIRMINGHAM, ENGLAND.

METHOD OF AND MEANS FOR CONTROLLING MECHANICALLY-PROPELLED VEHICLES.

Application filed June 8, 1925, Serial No. 35,832, and in Great Britain June 27, 1924.

This invention comprises certain improvements in or relating to the method of, and means for, controlling mechanically propelled vehicles, and the invention is particularly applicable for use in connection with road automobiles involving the usual clutch, the throttle actuatable by hand and by foot, and the brake or brakes actuatable by hand and by foot.

It is the object of the present invention primarily to avoid the unnecessary utilization of power of the engine while still permitting of the engine being utilized as a brake when desired.

According to the present invention it comprehends provision whereby the clutch is automatically disengaged when the engine is idling. Thus when progressing along a declevity it is impossible for the clutch to remain engaged if the throttle valve is in the idling position so that the engine is not functioning as a brake. The operator is also relieved from the necessity of retaining the clutch in the released position.

The present invention furthermore provides that in the event of the brake being applied the clutch is automatically engaged so that the braking effort offered by the engine is additionally made use of.

The present invention also provides that if the operator should accelerate, the clutch is automatically engaged.

So soon as the throttle is actuated either by foot or hand to accelerate, the mechanism according to the present invention is automatically placed out of operation so that all manipulating devices are enabled to function in the ordinary way.

In one method of carrying the invention into effect we provide a negative pressure cylinder which is placed in communication with the induction system between the throttle valve and the engine proper by a conduit, in which conduit a valve is incorporated. This valve co-operates with the accelerator pedal and the hand throttle lever and also with the brake pedal and the brake hand lever. This valve is of such a character, and so incorporated in combination with these elements, that in normal running the negative pressure cylinder is isolated from the induction effort of the engine and placed in communication with the atmosphere. When, however, the engine is idling the accelerator pedal is adapted to retain the valve in a position in which it places the negative pressure cylinder in communication with the induction system. A piston is provided in the negative pressure cylinder and this piston is appropriately coupled to the clutch in manner such that the negative induction pressure transmitted to the negative pressure cylinder operates to release the clutch. These conditions obtain when the accelerator pedal is in its idling position. As soon as the accelerator pedal is advanced it is adapted to so displace the valve that the negative pressure cylinder is placed in communication with the atmosphere instead of with the induction system so that under its ordinary spring the clutch is enabled to move into its engaged position. The brake is also adapted to displace the valve in manner such that the same conditions obtain,— namely, the negative pressure cylinder is isolated from the induction system and placed in communication with the atmosphere so that the clutch moves into engagement in its normal spring action.

These functions may be attained by the utilization of any appropriate valve system governed by the control element involved.

In order that this invention may be clearly understood and readily carried into practice, reference may be had to the appended sheets of explanatory drawings, on which Figure 1 illustrates in section a valve mechanism suitable for use in an apparatus according to the present invention.

Figure 2 illustrates from an aspect at right angles to that obtaining in Figure 1 a detail illustrated in the figure last mentioned.

Figure 3:
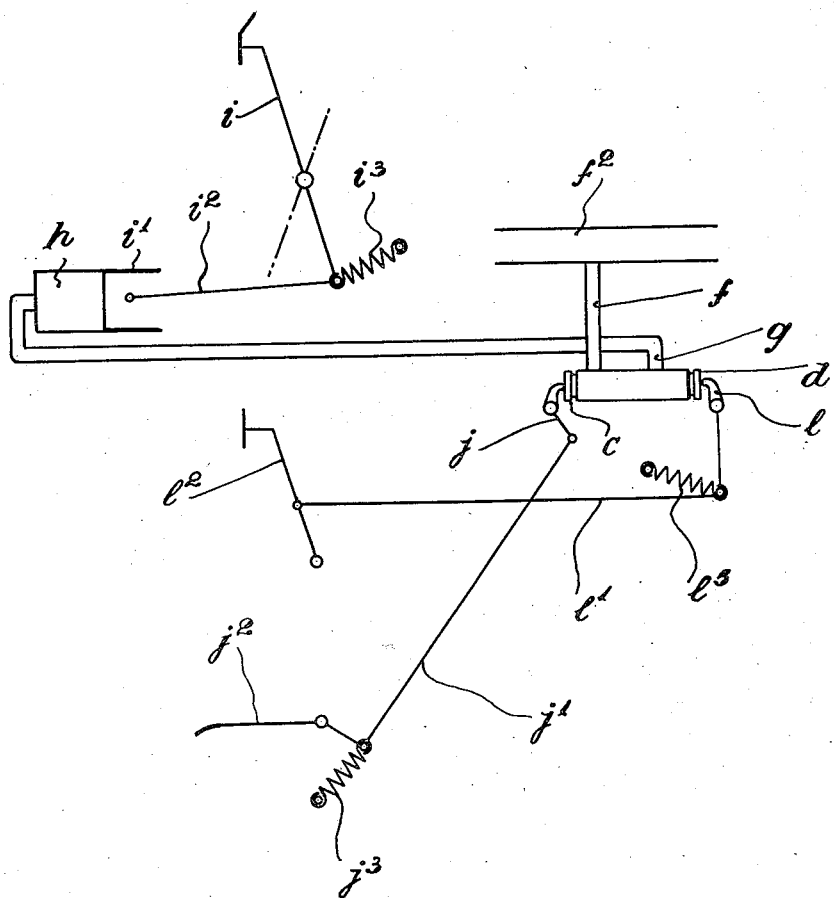
Figure 3 illustrates schematically an apparatus according to the present invention embodying the mechanism shown in Figure 1.

In a convenient embodiment of the present invention as shown in the drawings $a$ represents a housing containing a removable sleeve $b$ secured by a set screw $b^1$, and which removable sleeve $b$ functions as a cylinder for two valve members $c\ d$ capable of an axial movement therein. Between the valves $c\ d$ a coiled compression spring $e$ is incorporated and the valves $c\ d$ are limited in their downward movements by stops $c^1\ d^1$ suitably provided upon the housing $a$.

$f$ is a connection adapted to be placed in communication with the induction pipe $f^2$ of the engine (see Figure 3) and $g$ is a connection adapted to be placed in communication with the cylinder $h$, Figure 3, which is adapted automatically to operate the clutch pedal $i$ through the medium of a piston $i^1$ and connecting rod $i^2$.

The valve $c$ is adapted to co-operate with the lever $j$ which is coupled by a link $k$ $j^1$ to the accelerator pedal $j^2$ by which the carburettor is controlled, the arrangement being such that when the pedal $j^2$ (which is shown in Figure 2 partly depressed) is released the spring $j^3$ controlling same displaces, through the link $j^1$, the member $j$ in manner such that the valve $c$ is moved to the right (in Figure 1) so that the parts $c^*$ register at $f^1$ with the conduit $f$, thus placing the latter in communication with the interior of the valve $c$. When the valve $c$ is displaced in its fullest degree to the right (referring to Figure 1) openings $k$ offering communication with the atmosphere are closed and the conduit $f$ is thus placed in operative communication at $g^1$ with the conduit $g$ which communicates with the cylinder $h$ by which the clutch is actuated. $l$ is a lever adapted to be operated through a link $l^1$ from the brake pedal $l^2$ in manner such that when the said brake pedal $l^2$ is depressed to apply the brake the valve $d$ is forced to the left (in Figure 1) so closing the opening $g^1$ and at the same time placing the conduit $g$ at $g^2$ in communication with ports $d^*$ in the valve $d$ so that the conduit $g$ and, therefore, the cylinder $h$ are in communication with the atmosphere. Thus when the brake is applied the clutch is enabled to remain in engagement under its ordinary control spring $i^3$ enabling the engine to act as a brake, but if it is desired to release the clutch while applying the brake there is nothing to prevent this. In addition, if desired, a pin and slot or other connection may be provided between the clutch pedal $i$ and the link $i^2$ so that the former can be actuated by foot without imparting movement to the latter. Since the movement of the brake pedal is apt to vary it is desirable to accommodate this in some appropriate manner as for instance by providing in the lever $l$ a friction joint comprehending spring compressed washers $i^3$ between the lever $l$ proper and the arm $l^4$ thereof, which latter is the member which is directly operated through the link $l^1$ from the brake pedal $l^2$ against the resistance of the brake spring $l^5$. $l^6$ is a spring, the effort of which may be adjusted to govern the frictional engagement between the arms $l$ and $l^4$. $l^6$ is a projection on the bracket $l^7$ serving to limit the movement of the arm $l$ in a clockwise direction. When, therefore, the link $l^1$ moves to the right (in Figure 1) in applying the brake, the valve $d$ is displaced to the left after which the arm $l^4$ may continue to move in any desired degree by virtue of the friction discs $l^3$, the arm $l$ being in this movement stopped by the flange at the right hand extremity of the valve $d$. When the brake pedal is released or relaxed the link $l^1$ moves to the left with the result that the valve $d$ is released and in the subsequent full movement of the link $l^1$ to the left the friction clutch again functions so that the parts $l$ $l^4$ are restored to the relationship for operation of the valve $d$ by the primary movement of the pedal $l^2$.

According to another expedient spring provision (not shown) may be incorporated appropriately between the brake operating pedal $l^2$ and the valve $d$. With the utilization of such spring provision the valve $d$ is released in the latter part of the retractive movement of the brake pedal $l^2$ instead of in the primary part of such retractive movement.

From an examination of the drawings it will be observed that when the accelerator pedal $j^2$ is depressed the valve $c$ assumes the position shown in Figure 1, so that only when the accelerator pedal is not depressed is the valve $c$ in the position in which it places the conduit $f$ in communication with the cylinder $h$ thus pulling the clutch out of action. So soon as the brake is actuated the valve $d$ is moved to the left to neutralize these conditions, thus allowing the clutch to fall into engagement.

Since the valves $c$ $d$ may be subjected to the negative pressure transmitted from the cylinder $h$ it may be desirable to balance the effect of this negative pressure upon the said valves. In the case of the valve $c$ for instance for this purpose the cylinder $b$ may be closed at its left hand extremity and the central opening in the valve $c$ may pass entirely through this valve, the movement of the lever $j$ being transmitted through a tappet passing through a substantially gas-tight opening in the end closure portion of the cylinder $b$. The valve is thus influenced only by the lever $j$ and the spring $e$.

The above described embodiment of the invention, included by way of example, comprehends the method of actuation of the mechanism by virtue of gaseous pressure. Alternatively apparatus may be utilized whereby the desired functions may be fulfilled electrically.

The apparatus according to the present invention may be constructed in the form of a unit applicable to existing vehicles or engines.

Having described our invention, what we claim and desire to secure by Letters Patent is:—

1. Control mechanism for mechanically propelled vehicles wherein the clutch is adapted automatically to be disengaged when the engine is idling or running under light load and in which, in the event of the brake being applied, and in the event of the accelerator being actuated, the clutch is automatically engaged.

2. Control mechanism as claimed in the first claim, incorporating a negative pressure cylinder which is adapted to be placed in communication with the induction system, in which cylinder a piston is provided and adapted to disengage the clutch.

3. Control mechanism as claimed in the first claim, incorporating a valve system with which the brake operating member and the accelerator are adapted to cooperate substantially for the purpose set forth.

4. Control mechanism for mechanically propelled vehicles wherein the power unit is adapted, as a result of the operator taking the action necessary to cause it to decelerate, to function to bring about a discontinuation of the transmission of power from the said power unit to the road wheels.

5. Control mechanism as claimed in the fourth claim, incorporating provision for bringing about a discontinuation of the said function of the engine in the event of the brake being applied.

6. Control mechanism as claimed in the fourth claim, incorporating provision for bringing about a discontinuation of the said function of the engine in the event of the control provision being manipulated in the manner necessary to accelerate the power unit.

7. Control mechanism for mechanically propelled vehicles wherein the power transmission mechanism is adapted automatically to be disconnected when the power unit is idling or running under light load and in which the disconnecting means while being adapted to be actuated by function of the means utilized for decelerating the power unit, are independent of such means in so far as interactuation of a purely mechanical character is concerned.

8. Control mechanism for mechanically propelled vehicles, wherein the power transmission mechanism is adapted to assume a disconnected condition and in which, in the event of the brake being applied the power transmission mechanism is adapted automatically to be connected.

9. Control mechanism for mechanically propelled vehicles in which the power transmission mechanism is enabled to assume a disengaged position, and in which the power transmission mechanism is adapted automatically to be connected upon acceleration of the power unit by the function of mechanism which is independent, in so far as interactuation of a purely mechanical character is concerned, of that utilized for accelerating the power unit.

10. Control mechanism as claimed in the fourth claim, wherein the function of bringing about the discontinuation of the transmission of power from the power unit to the road wheels is fulfilled by pneumatic power.

In witness whereof I affix my signature.

CLEMENT BROWN.